(12) United States Patent
Furtner

(10) Patent No.: US 7,636,806 B2
(45) Date of Patent: Dec. 22, 2009

(54) ELECTRONIC SYSTEM AND METHOD FOR SENDING OR RECEIVING A SIGNAL

(75) Inventor: Wolfgang Furtner, Fuerstenfeldbruck (DE)

(73) Assignee: Infineon Technologies AG, Neubiberg (DE)

( * ) Notice: Subject to any disclaimer, the term of this patent is extended or adjusted under 35 U.S.C. 154(b) by 138 days.

(21) Appl. No.: 11/851,917

(22) Filed: Sep. 7, 2007

(65) Prior Publication Data

US 2009/0070506 A1 Mar. 12, 2009

(51) Int. Cl.
*G06F 1/00* (2006.01)
*G06F 13/00* (2006.01)

(52) U.S. Cl. .................... 710/106; 710/110; 710/105

(58) Field of Classification Search .......... 710/105, 710/106, 110
See application file for complete search history.

(56) References Cited

U.S. PATENT DOCUMENTS

| | | | | |
|---|---|---|---|---|
| 5,003,194 A * | 3/1991 | Engelhard | .................... | 327/176 |
| 6,513,080 B1 * | 1/2003 | Haq | ............................ | 710/107 |
| 7,130,944 B2 * | 10/2006 | Perino et al. | ................ | 710/110 |
| 7,136,772 B2 * | 11/2006 | Duchi et al. | ................ | 702/118 |
| 7,222,199 B2 * | 5/2007 | Jolly et al. | ..................... | 710/60 |
| 2006/0153326 A1 * | 7/2006 | Choi | .......................... | 375/360 |
| 2008/0144728 A1 * | 6/2008 | Ruehle | ....................... | 375/253 |

* cited by examiner

*Primary Examiner*—Glenn A Auve
(74) *Attorney, Agent, or Firm*—Dicke, Billig & Czaja, PLLC

(57) ABSTRACT

A method operating an electronic system including sending or receiving a signal is disclosed. One embodiment includes changing a parameter of a signal from a first value to a second value after a first time duration if a logic zero is to be transmitted, and changing the parameter of the signal from the first value to the second value after a second time duration if a logic one is to be transmitted.

24 Claims, 4 Drawing Sheets

Time Distance Coding

| Duration | Code | Time | | | | |
|---|---|---|---|---|---|---|
| | | | Receiver | | Transmitter | |
| | | Nominal | Minimal | Maximal | Minimal | Maximal |
| Short | 0 | $1*\tau$ | 0 | $2*\tau$ | $0.5*\tau$ | $1.5*\tau$ |
| Long | 1 | $3*\tau$ | $2*\tau$ | $4*\tau$ | $2.5*\tau$ | $3.5*\tau$ |
| Very Long | STOP | $>5*\tau$ | $4*\tau$ | infinite | $4.5*\tau$ | infinite |

Time Distance Coding

| Duration | Code | Time Nominal | Receiver Minimal | Receiver Maximal | Transmitter Minimal | Transmitter Maximal |
|---|---|---|---|---|---|---|
| Short | 0 | $1*\tau$ | 0 | $2*\tau$ | $0.5*\tau$ | $1.5*\tau$ |
| Long | 1 | $3*\tau$ | $2*\tau$ | $4*\tau$ | $2.5*\tau$ | $3.5*\tau$ |
| Very Long | STOP | $>5*\tau$ | $4*\tau$ | infinite | $4.5*\tau$ | infinite |

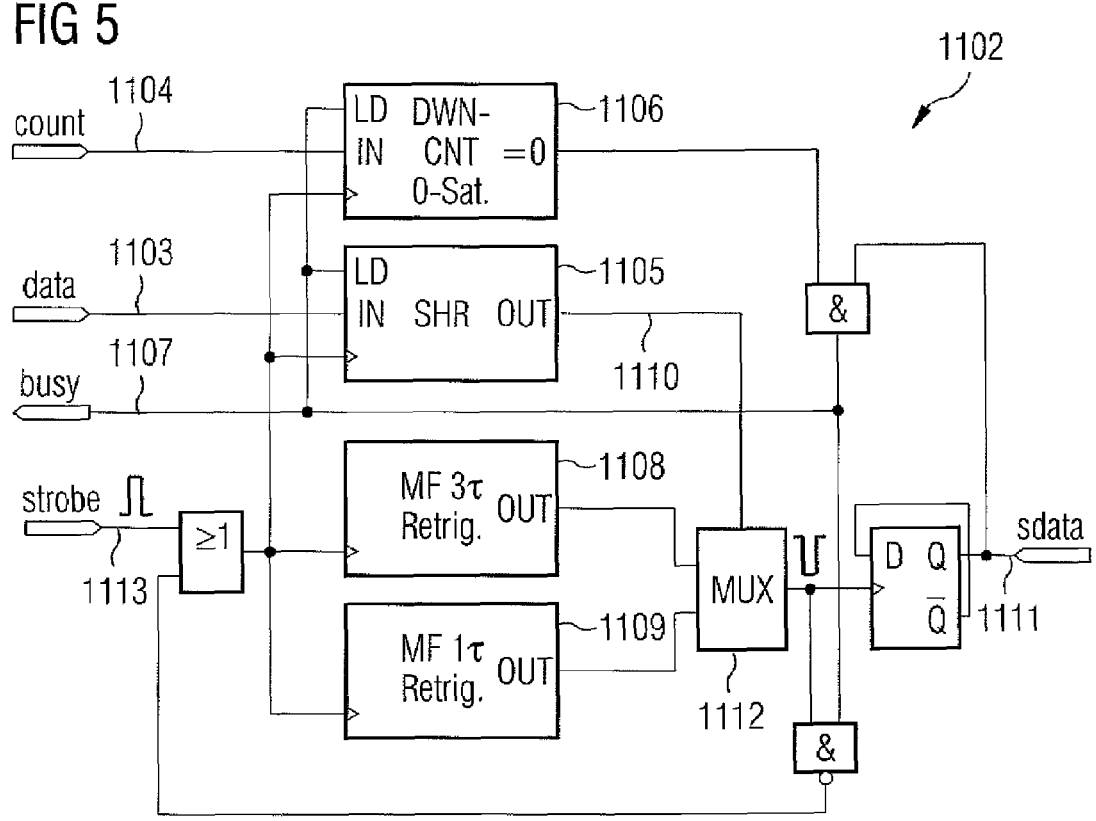
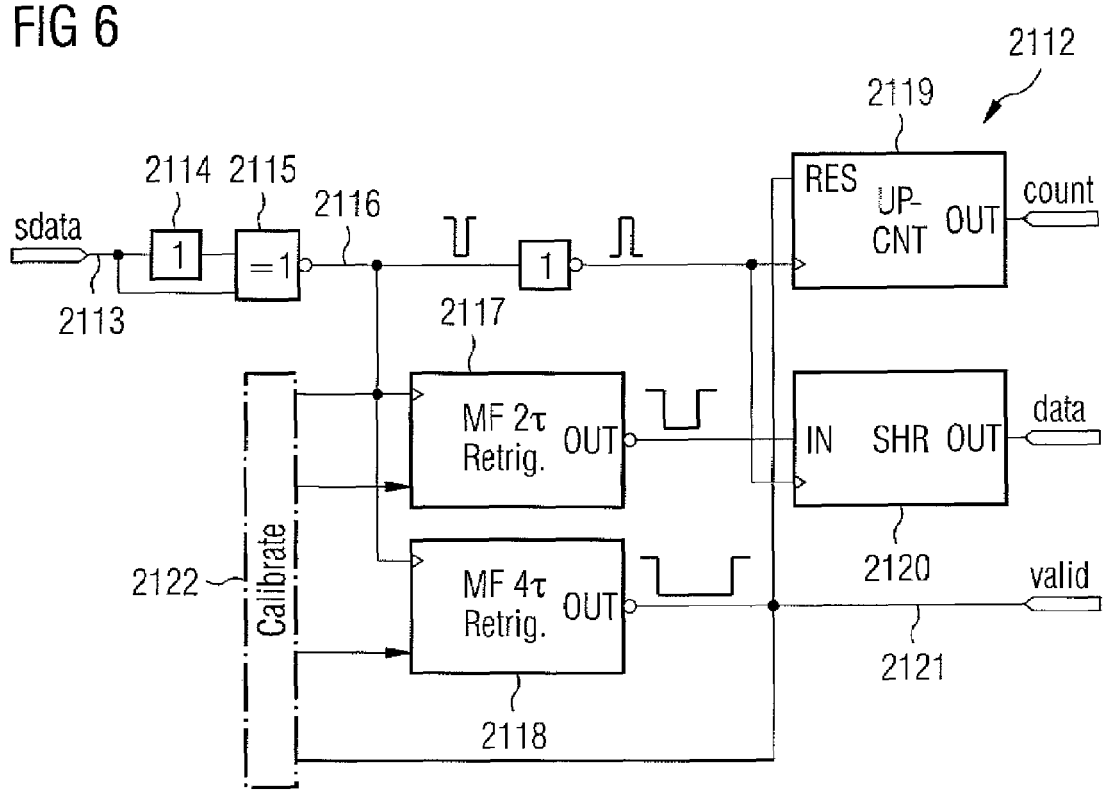

ELECTRONIC SYSTEM AND METHOD FOR SENDING OR RECEIVING A SIGNAL

BACKGROUND

The invention relates to an electronic system, an interface, an integrated circuit chip with an interface, an electronic system, a method of sending or receiving a signal in an electronic system, and a data transmission method.

In conventional electronic systems, individual system modules, for instance various electronic assemblies, various integrated circuit chips installed on an individual electronic assembly, or various sub-components provided on one and the same integrated circuit chip, etc. communicate via a transfer medium—for instance a bus system.

A bus system may consist of one or more transfer lines. Bus systems, for instance a corresponding chip-internal bus system, a bus system provided on an individual electronic assembly including several integrated circuit chips, etc. can be jointly used by several, in particular by two or more than two system modules (sub-components of an integrated circuit/ integrated circuits/electronic assemblies, etc.).

Further, a bus system e.g., may include several partial systems, for example a data bus, an address bus, and a control bus. The data bus—consisting of one or more data lines— may be used for the transfer of the actual payload data, the address bus—consisting of one or more address lines—for transferring address data, and the control bus—consisting of one or more control lines—for transferring control data, etc.

For the receipt and/or sending of data via a respective bus system, respective interfaces are provided at the respective system module (e.g., the respective integrated circuit/electronic assembly, etc.).

An interface may include one or several transmitters for the sending of data, and/or one or several receivers for the receipt of data.

The interface e.g., is connected e.g., via respective pins or pads to the bus system.

In general, a low pin count/pad count is desirable.

Conventionally, UARTs (UART=Universal Asynchronous Receiver Transmitter) have been used for low pin-count data communication. UARTs e.g., allow for point-to-point data links in simplex mode, duplex mode, or half-duplex mode. In general, in UART connections, no clock signal is transmitted. Thus, precise timing references (e.g., respective crystal clocks) are required for both transmitters and receivers.

Further, in low pin count applications, an I²C-Bus is used. The I²C-Bus specifies two signal lines, one clock line, and one data line.

For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 5 illustrates a schematic, exemplary representation of a transmitter circuit of a system module in accordance with one embodiment.

FIG. 6 illustrates a schematic, exemplary representation of a receiver circuit of a system module in accordance with one embodiment.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
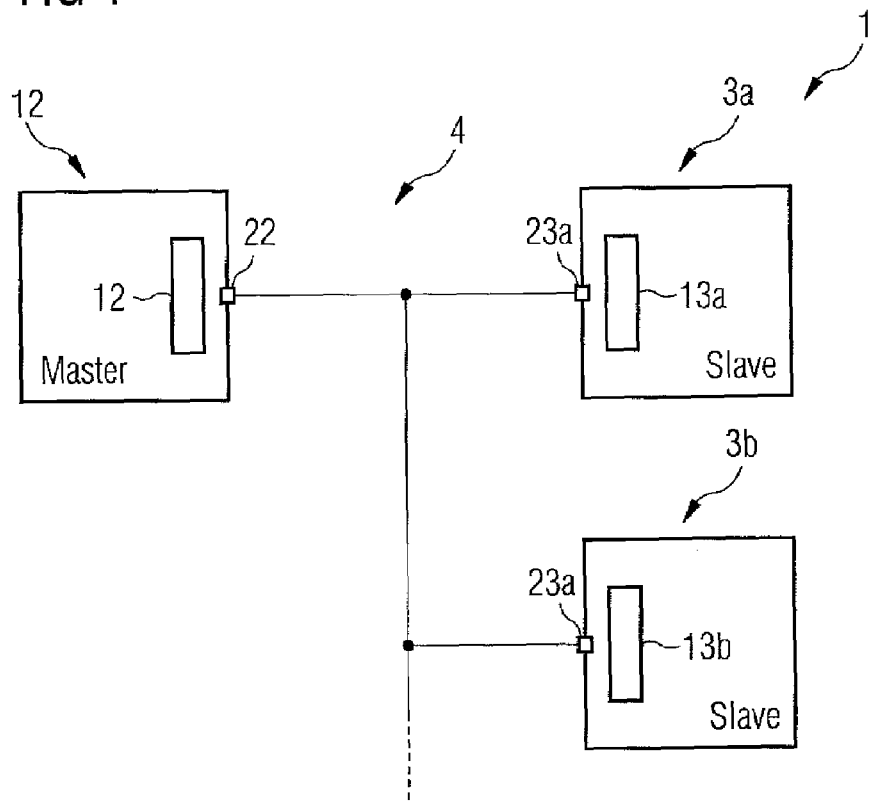
FIG. 1 illustrates a schematic, exemplary representation of an electronic system in accordance with one embodiment.

FIG. 1 illustrates a schematic, exemplary representation of an electronic system 1 in accordance with an embodiment of the invention.

In accordance with the present embodiment, the electronic system 1 includes several individual system modules 2, 3a, 3b, etc.

As will be described in further detail below, each system module 2, 3a, 3b either operates as a "master", or a "slave".

The system 1 may include one single system module that takes the role of a "master" (here: e.g., the system module 2), and several system modules that take the role of a slave (e.g., two or more system modules, here: the system modules 3a, 3b). In embodiments, the system 1 e.g., may include one single slave only, and/or may include more than one master, etc.

The system modules 2, 3a, 3b e.g., may be respective integrated circuits 2, 3a, 3b that as will be described in further detail below, communicate via a bus 4. The integrated circuits 2, 3a, 3b e.g., may be mounted into respective housings.

The system modules 2, 3a, 3b e.g., may be respective electronic assemblies, e.g., printed circuit boards 2, 3a, 3b, each printed circuit board 2, 3a, 3b e.g., including one or several integrated circuit chips mounted into respective housings.

According to a further embodiment, the electronic system e.g., may be a single integrated circuit chip 1, and the system modules 2, 3a, 3b may be respective sub-components of the single integrated circuit chip 1 which communicate via the above bus system 4, etc.

As is illustrated in FIG. 1, for the receipt and/or sending of data via the bus system 4, respective interfaces 12, 13a, 13b are provided at the system modules 2, 3a, 3b.

As will be described in further detail below, and as is e.g., illustrated in FIG. 2, each interface (i.e., SWI Master and SWI Slave) includes a transmitter 102, 103 for the sending of data, and a receiver 112, 113 for the receipt of data. The data to be sent is temporarily stored in a switch (i.e., SWI TX), and the received data is temporarily stored in a switch (i.e., SWI RX).

Again referring to FIG. 1, each interface 12, 13a, 13b via a respective connection 22, 23a, 23b is connected to the bus system 4. In the case of an integrated circuit 2, 3a, 3b, the connection e.g., may be a respective (single) pad 22, 23a, 23b provided at the integrated circuit 2, 3a, 3b, or a respective (single) pin 22, 23a, 23b provided at the housing of the respective integrated circuit, which e.g., is connected via a respective bonding wire to a respective (single) pad of the integrated circuit.

Figure 2:
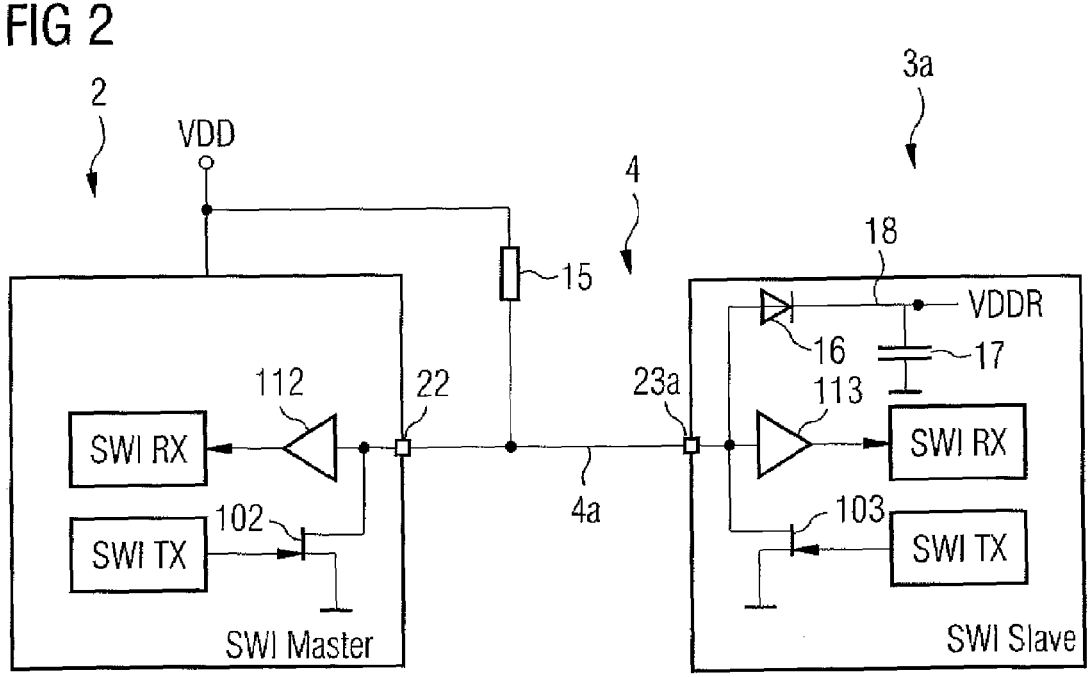
FIG. 2 illustrates a schematic, exemplary representation of a system module functioning as a master and a system module functioning as a slave in accordance with one embodiment.

As is e.g., illustrated in FIG. 2, the transfer of data via the bus system 4—regardless of whether data is sent from a master to a slave, or vice versa—is based on the transmission of signals via one single line 4a.

One end of the line 4a e.g., is connected to the above connection 22 of the "master" module 2, e.g., the respective pin/pad 22 of the respective integrated circuit/integrated circuit housing, and the other end of the line 4a is connected to the above connection 23a of the "slave" module 3a, e.g., the respective pin/pad 23a of the respective integrated circuit/integrated circuit housing.

As will be described in further detail below, the transfer of data via the (single) line 4a of the bus system 4 is based on "time distance coding".

Figure 3:
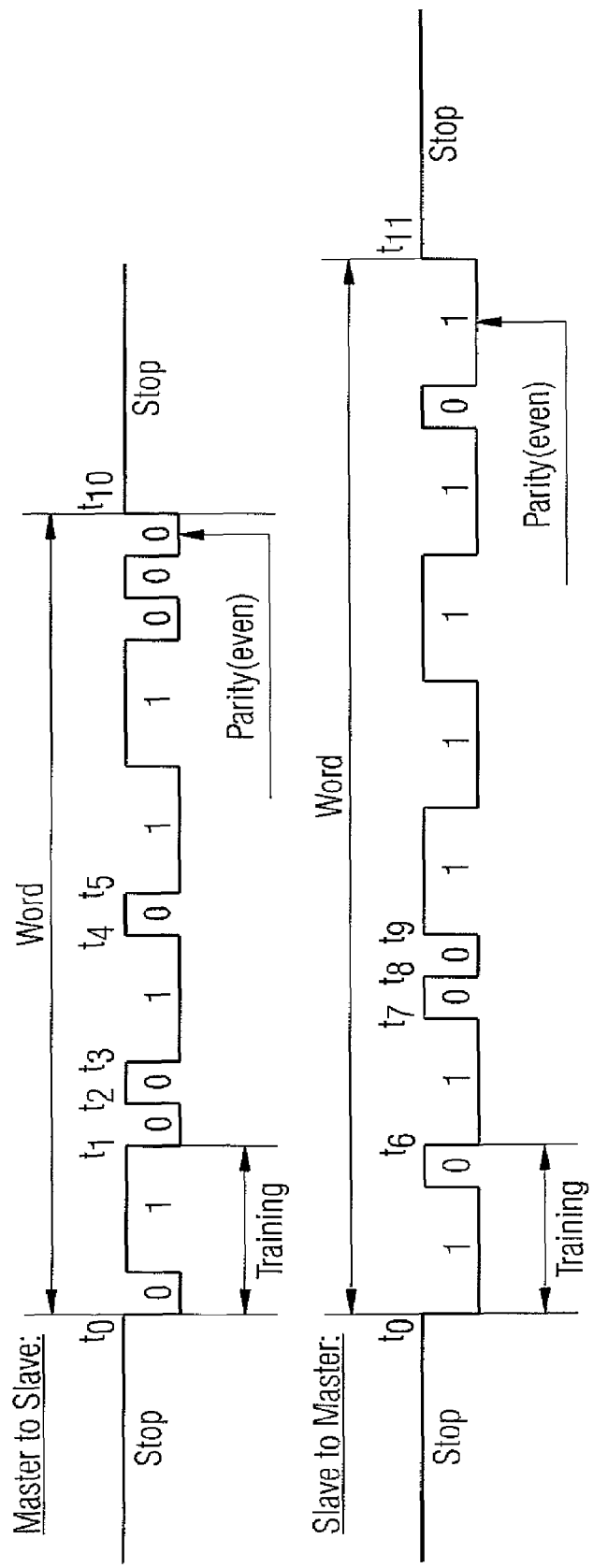
FIG. 3 illustrates a schematic, exemplary representation of a signal sent from a master to a slave, and a signal sent from a slave to a master in accordance with one embodiment.
Figure 4:
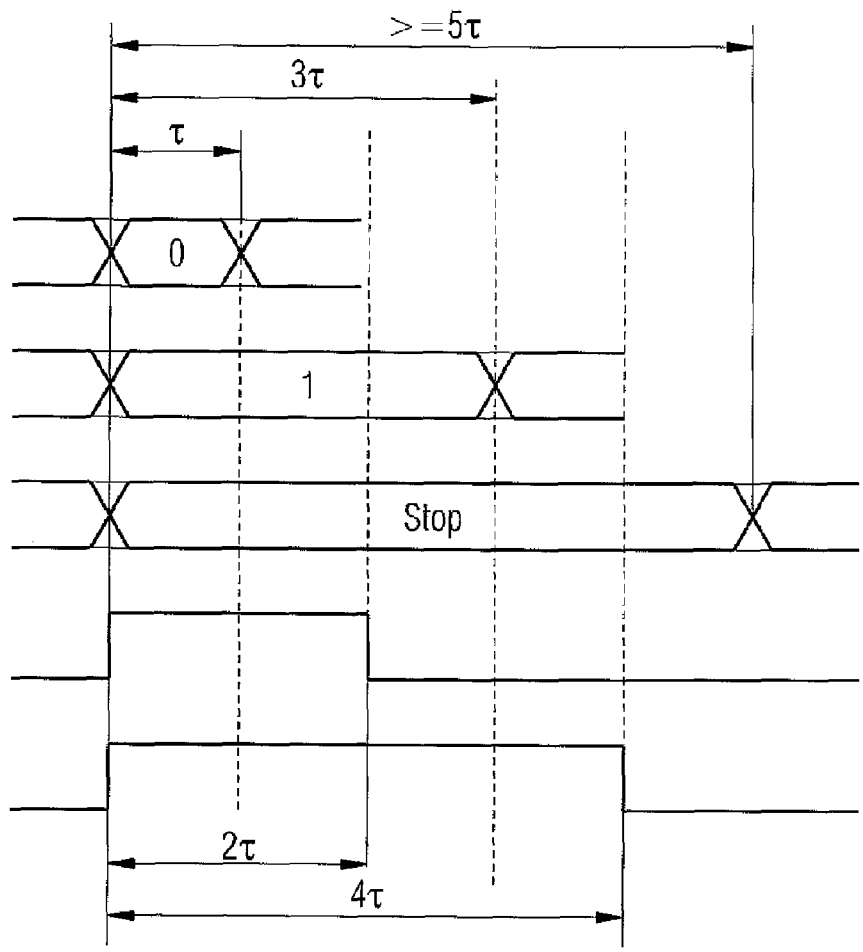
FIG. 4 illustrates the time distances used according to the time distance coding in accordance with one embodiment.

As e.g., illustrated in FIGS. 3 and 4, according to the time distance coding applied according to the present specific embodiment, the time between signal changes is classified in three duration classes.

Relatively short durations between signal changes e.g., denote a logic $0_B$ (logic zero) (or e.g., a logic $1_B$ (logic 1)). Further, relatively long durations between signal changes e.g., denote a logic $1_B$ (or e.g., a logic $0_B$). Further, very long durations between signal changes e.g., denote a respective command, e.g., a STOP condition.

The above relatively short duration between signal changes (e.g., denoting a logic $0_B$) define a time $\tau$ which is used as a time base for the electronic system 1. All other of the above durations are defined relative to the above time $\tau$.

For instance, and as is illustrated in FIGS. 3 and 4, the above relatively long duration between signal changes (e.g., denoting a logic $1_B$) e.g., may be chosen to be approximately $3\tau$, and the above very long duration between signal changes (e.g., denoting a STOP condition) e.g., may be chosen to be approximately $5\tau$ or longer.

Hence, by way of example, and as is illustrated in FIG. 3, if from the "master" system module 2 e.g., a logic $0_B$ is to be sent via the bus system 4 to the "slave" system module 3a, the "master" system module 2 changes the state of the line 4a e.g., at a time t1 (e.g., from a high voltage level to a low voltage level), and—after the above relatively short duration $\tau$, i.e., at a time t2—again changes the state of the line 4a (e.g., back from the low voltage level to the high voltage level). If then again a logic $0_B$ is to be sent via the bus system 4 from the "master" system module 2 to the "slave" system module 3a, the "master" system module 2 again changes the state of the line 4a after the above relatively short duration $\tau$, i.e., at a time t3 (e.g., back from the high voltage level to the low voltage level).

If then a logic $1_B$ is to be sent via the bus system 4 from the "master" system module 2 to the "slave" system module 3a, the "master" system module 2 changes the state of the line 4a after the above relatively long duration $3\tau$, i.e., at a time t4 (e.g., back from the low voltage level to the high voltage level). If then a logic $0_B$ is to be sent via the bus system 4 from the "master" system module 2 to the "slave" system module 3a, the "master" system module 2 changes the state of the line 4a after the above relatively short duration $\tau$, i.e., at a time t5 (e.g., back from the high voltage level to the low voltage level), etc.

Correspondingly similar, and as is illustrated in FIG. 3, if from the "slave" system module 3a e.g., a logic $1_B$ is to be sent via the bus system 4 to the "master" system module 2, the "slave" system module 3a changes the state of the line 4a e.g., at a time t6 (e.g., from a high voltage level to a low voltage level), and—after the above relatively long duration $3\tau$, i.e., at a time t7—again changes the state of the line 4a (e.g., back from the low voltage level to the high voltage level). If then a logic $0_B$ is to be sent via the bus system 4 from the "slave" system module 3a to the "master" system module 2, the "slave" system module 3a changes the state of the line 4a after the above relatively short duration $\tau$, i.e., at a time t8 (e.g., back from the high voltage level to the low voltage level).

If then again a logic $0_B$ is to be sent via the bus system 4 from the "slave" system module 3a to the "master" system module 2, the "slave" system module 3a changes the state of the line 4a after the above relatively short duration $\tau$, i.e., at a time t9 (e.g., back from the low voltage level to the high voltage level), etc.

Hence, to send a respective series of bits via the line 4a, the state of the line is toggled between the above high voltage and low voltage level states. In other word, the amplitude of the signal sent from the respective transmitter 102, 103 to the respective receiver 112, 113 toggles according to the above time distance coding.

In further embodiments, instead of toggling the signal amplitude according to the above time distance coding, other signal parameters may be toggled, e.g., the frequency, or the phase. Hence, instead of respective amplitude changes, respective changes between signal phases, or changes between signal frequencies might be carried out.

For instance, the frequency of the signal transmitted via the above line 4a might change between e.g., two different values (e.g., between a relatively high and a relatively low value). For instance, if a logic $0_B$ (or e.g., a logic $1_B$) is to be sent via the bus system 4, the respective transmitter 102, 103 changes the frequency of the signal after the above relatively short duration $\tau$ (e.g., from a relatively high to a relatively low value). If then again a logic $0_B$ (or e.g., a logic $1_B$) is to be sent via the bus system 4, the respective transmitter 102, 103 again changes the frequency of the signal after the above relatively short duration $\tau$ (e.g., back from a relatively low to a relatively high value). If then a logic $1_B$ (or e.g., a logic $0_B$) is to be sent via the bus system 4, the respective transmitter 102, 103 changes the frequency of the signal after the above relatively long duration $3\tau$ (e.g., back from a relatively high to a relatively low value), etc.

In a further variant, the frequency of the signal transmitted via the above line 4a might change between e.g., a respective first value (i.e., a respective AC value), and zero (i.e., DC). For instance, if a logic $0_B$ is to be sent via the bus system 4, the respective transmitter 102, 103 changes the frequency of the signal after the above relatively short duration $\tau$ (e.g., from the above AC value to DC). If then again a logic $0_B$ is to be sent via the bus system 4, the respective transmitter 102, 103 again changes the frequency of the signal after the above relatively short duration τ (e.g., back from DC to the above AC value). If then a logic $1_B$ is to be sent via the bus system 4, the respective transmitter 102, 103 changes the frequency of the signal after the above relatively long duration 3τ (e.g., back from the above AC value to DC), etc.

As is illustrated in FIG. 4, each transmitter 102, 103 carries out the modulation of the signal changes (with e.g., respect to amplitude, frequency, or phase of the signal) with relatively high accuracy. E.g., to denote e.g., a logic $0_B$ the duration between signal changes should e.g., be at least 0.5τ, and e.g., not more than 1.5τ ("short duration"). Further, to denote e.g., a logic $1_B$ the duration between signal changes should e.g., be at least 2.5τ, and e.g., not more than 3.5τ ("long duration"). Further, to e.g., denote a STOP condition, the duration between signal changes should e.g., be at least 4.5τ ("very long duration").

As is also illustrated in FIG. 4, at a respective receiver 112, 113, a duration between signal changes of a received signal between e.g., 0τ and e.g., 2τ e.g., will be interpreted as "short duration", e.g., as a received logic $0_B$. Further, at a respective receiver 112, 113, a duration between signal changes of a received signal between e.g., 2τ and e.g., 4τ e.g., will be interpreted as "long duration", e.g., as a received logic $1_B$. Still further, at a respective receiver 112, 113, a duration between signal changes of a received signal of more than 4τ e.g., will be interpreted as "very long duration", e.g., as a received STOP condition.

Hence, the three possible codes ($0_B$, $1_B$, STOP) are transmitted by the respective transmitter 102, 103 by modulating the duration between signal toggles, wherein the different duration times correspond to integer multiples of the above time base τ (here: 1τ, 3τ, 5τ). To distinguish between the codes, the respective receiver 112, 113 uses two time thresholds, also corresponding to integer multiples of the above time base τ (here: 2τ, 4τ).

In further embodiments, more than the above three possible codes may be transmitted, e.g., four or more possible codes, e.g., logic $0_B$, logic $1_B$, and two different commands (e.g., a first command, and a second command). For instance, a very short duration between signal changes (e.g., a duration τ) e.g., might denote a logic $0_B$. Further, a relatively short duration between signal changes (e.g., a duration 3τ) e.g., might denote a logic $1_B$. Further, a relatively long duration between signal changes (e.g., a duration 5τ) e.g., might denote the above first command, and a very long duration between signal changes (e.g., a duration 7τ or more) e.g., the above second command.

In additional embodiments, the above signals/codes are not transmitted via the above (single) line/wire 4a, but wirelessly.

For instance, the frequency of a signal transmitted wirelessly might change between e.g., two different values (e.g., between a relatively high and a relatively low value). For instance, if a logic $0_B$ (or e.g., a logic $1_B$) is to be sent wirelessly, a respective wireless transmitter changes the frequency of a wirelessly sent signal after the above relatively short duration τ (e.g., from a relatively high to a relatively low value). If then again a logic $0_B$ (or e.g., a logic $1_B$) is to be sent wirelessly, the respective transmitter again changes the frequency of the wirelessly sent signal after the above relatively short duration τ (e.g., back from a relatively low to a relatively high value). If then a logic $1_B$ (or e.g., a logic $0_B$) is to be sent wirelessly, the respective transmitter changes the frequency of the signal after the above relatively long duration 3τ (e.g., back from a relatively high to a relatively low value), etc.

Further, e.g., the phase of a signal transmitted wirelessly might change between e.g., two different values (e.g., between a relatively high and a relatively low value). For instance, if a logic $0_B$ (or e.g., a logic $1_B$) is to be sent wirelessly, a respective wireless transmitter changes the phase of a wirelessly sent signal after the above relatively short duration τ (e.g., from a relatively high to a relatively low value). If then again a logic $0_B$ (or e.g., a logic $1_B$) is to be sent wirelessly, the respective transmitter again changes the phase of the wirelessly sent signal after the above relatively short duration τ (e.g., back from a relatively low to a relatively high value). If then a logic $1_B$ (or e.g., a logic $0_B$) is to be sent wirelessly, the respective transmitter changes the phase of the signal after the above relatively long duration 3τ (e.g., back from a relatively high to a relatively low value), etc.

FIG. 3 by way of example illustrates the transmission of a word from a master system module 2 to a slave system module 3a, and vice versa.

As is illustrated in FIG. 3, words are separated by respective STOP codes (e.g., a STOP code sent at a time t0, and a further stop code sent at a time t10, t11, respectively).

Each word e.g., might include an odd number of bits (here, e.g., 11 bits).

Further, each words starts with the sending of a training sequence, e.g., a training sequence including two different bits.

If by a master system module 2 data is to be sent to a slave system module 3a, as a training sequence e.g., first a logic $0_B$ is sent, and then a logic $1_B$. Conversely, if by a slave system module 3a data is to be sent to a master system module 2, as a training sequence e.g., first a logic $1_B$ is sent, and then a logic $0_B$ (see FIG. 3).

For instance, and as is illustrated in FIG. 3, if e.g., from the master system module 2 a training sequence is to be sent, e.g., first a logic $0_B$ is sent. For this purpose, the master system module 2 e.g., changes the state of the line 4a e.g., at a time t0 (e.g., from a high voltage level to a low voltage level), and— after the above relatively short duration τ—again changes the state of the line 4a (e.g., back from the low voltage level to the high voltage level). Thereafter a logic $1_B$ is sent. For this purpose, the master system module 2—after the above relatively long duration 3τ—again changes the state of the line 4a (e.g., back from the high voltage level to the low voltage level).

If instead of by the master system module 2, a training sequence is to be sent by the slave system module 3a, the opposite bits are sent. For instance, e.g., first a logic $1_B$ is sent. For this purpose, the slave system module 3a e.g., changes the state of the line 4a e.g., at a time t0 (e.g., from a high voltage level to a low voltage level), and—after the above relatively long duration 3τ—again changes the state of the line 4a (e.g., back from the low voltage level to the high voltage level). Thereafter a logic $0_B$ is sent. For this purpose, the slave system module 3a—after the above relatively short duration τ—again changes the state of the line 4a (e.g., back from the high voltage level to the low voltage level).

Hence, the training sequence used by a master is different from the training sequence used by a slave. The difference between the training sequences is used to distinguish between a master-to-slave-transfer, and a slave-to-master-transfer.

The training sequence allows to calibrate the time base τ to be applied by the respective receiver 112, 113 every time a new word is sent. For instance, if a first word is to be sent by a master, the time base $τ_1$ might be chosen to be shorter than the time base $τ_2$ chosen for the subsequent transmission of a second word to be sent by the master, which in turn e.g., might be chosen to be longer than the time base T3 chosen for the subsequent transmission of a third word (which however e.g., might be chosen to be longer than the above time base $τ_1$ chosen for the transmission of the above first word, etc.). Due to the above calibration of the time base τ on a word-by-word basis, e.g., the slave system modules 3a, 3b might be built without exact timing reference (e.g., without a crystal clock/without a crystal clock generating device).

The training sequence bits are followed by a predetermined number of (payload data) bits, e.g., a power of two multiple of one byte (e.g., 8 bits, as in the present embodiment, or e.g., 16, 32, or 64 bits).

At the end of the word, a parity bit may be transmitted. E.g., even parity may be chosen, since this adds a bit of a value of logic $0_B$ to a word including only payload data bits of a value of logic $1_B$, i.e., to a word with maximum payload data bit transmission time, and hence reduces the total maximum word transmission time (i.e., the transmission time for all of the training sequence bits, payload data bits, and parity bits). Instead of or in addition to a parity bit, respective error detection and/or error correction bits may be sent.

As is illustrated in FIG. 2, the above line 4a of the bus system 4 may e.g., be a wired and signal line 4a. The signal line 4a might be connected to a supply voltage VDD via one respective pull-up resistor 15 (or more than one pull-up resistor). Further, the respective transmitters 102, 103 each may e.g., include one or several transistors, e.g., FET-transistors. The source-drain-paths of the transistors are connected between ground, and a respective connection/pad/pin 22, 23a, i.e., are connected between ground, and the signal line 4a. A respective transistor then e.g., might send a logic $0_B$ via the line 4a by respectively pulling the line 4a with an open-drain output. Hence, to send a logic $0_B$, the respective transistor may be brought into a conductive/activated state, e.g., by applying a respective signal at the control input/gate input of the transistor. In contrast, to send a logic $1_B$, the respective transistor may be brought into a non-conductive/deactivated state, e.g., by applying a respective (inverse) signal at its control input/gate input. Only one transmitter with its respective transistor/transistors is allowed to be activated at a time.

By the above receivers 112, 113, the state of the line 4a is sensed with a high impedance input. According to an embodiment, signal levels according to LVTLL standards may be used. Suitable other signal levels may also be applied.

As is illustrated in FIG. 2, one or more of the system modules, e.g., one or more slave system modules 3a may be provided with an additional diode 16, and an additional capacitor 17, e.g., an additional built-in capacitor.

The anode of the diode 16 e.g., may be connected to the respective connection/pad/pin 22, 23a of the respective system module 2, 3a (and hence, also to the input of the respective receiver 112, 113, and the output of the respective transmitter 102, 103). Further, the cathode of the diode 16 may be connected to a first connection of the capacitor 17, and a line 18. A second connection of the capacitor 17 may be connected to ground.

Hence, the above high voltage level state of the line 4a may be used to charge the capacitor 17 via the diode 16. Hence, at the line 18, a respective internal supply voltage VDDR for the respective system module 3a is provided.

The capacitor 17 may be dimensioned such that even words with continuing logic $10_B$ sequences (i.e. words where the total time where the line 4a is in the low voltage state is maximal) do not discharge the capacitor below the minimum internal supply voltage VDDR needed for the respective system module 3a.

FIG. 5 illustrates a schematic, exemplary representation of a transmitter circuit 1102 of a system module. As is illustrated in FIG. 5, the transmitter circuit 1102 is asynchronous; however, also synchronous transmitter circuits may be used.

As is illustrated in FIG. 5, a parallel data word (data) and the number of bits to be transmitted (count) are strobed via respective lines 1103, 1104 into a shift register 1105, and a down-counter 1106, respectively (here: by applying a strobe signal on a line 1113). A respective signal (busy) on a line 1107 is asserted as long as the down-counter 1106 holds a value greater than zero. The above strobe also launches two re-triggerable mono-flops 1108, 1109 with time constants for logic $0_B$ (1τ) and logic $1_B$ (3τ), respectively. The output of the shift register 1105 on a line 1110 is provided to the control input of a multiplexer 1112, and hence determines which of the mono-flops' 1108, 1109 falling edges is used to relaunch both mono-flops 1108, 1109, to shift the shift register 1105, to decrement the down-counter 1106, and to toggle the output (sdata) of the transmitter circuit 1102 on a line 1111. This continues until the down-counter 1106 is elapsed, and the output (sdata) is in a high voltage state. This condition also de-asserts the busy—signal on the line 1107.

The output (sdata) of the transmitter circuit 1102 e.g., may be used to suitably control a transistor of a respective transmitter 102, 103, as illustrated in FIG. 2.

FIG. 6 illustrates a schematic, exemplary representation of a receiver circuit 2112 of a system module. As is illustrated in FIG. 6, the receiver circuit 2112 is asynchronous; however, also synchronous receiver circuits may be used.

As is illustrated in FIG. 6, each toggle of an input signal (sdata) on a line 2113 by use of a respective delay gate 2114, and a XNOR gate 2115 may be transformed in a respective short pulse present on a line 2116. The input signal (sdata) on the line 2113 e.g., may be controlled by an output of a respective receiver 112, 113, as illustrated in FIG. 2. Again referring to FIG. 6, the above (short) pulse on the line 2116 of the receiver circuit 2112 launches two re-triggerable mono-flops 2117, 2118 with time constants of 2τ and 4τ, respectively, and synchronously resets an up-counter 2119. The output valid signal on a line 2121 is de-asserted. If the next toggle of the input signal (sdata) on the line 2113 occurs before 2τ elapses, a $0_B$ is strobed into an output shift register 2120. Otherwise, and if the next toggle of the input signal (sdata) on the line 2113 occurs before 4τ elapses, a $1_B$ is strobed into the output shift register 2120. With every toggle of the input signal (sdata) the up-counter 2119 is incremented. If 4τ elapses before the next toggle occurs a STOP condition is reached. In this case, the output valid signal on the line 2121 is asserted. At this time, the data output of the shift register 2120 holds the parallel output data, and the count output of the up-counter 2119 holds the number of valid bits of the data output of the shift register 2120. The parallel data output of the shift register holds the complete word as sent by the respective transmitter, i.e., the training sequence bits, the payload data bits, and the parity bit. In an embodiment, and as already indicated above, the training sequence of a respective word can be used to calibrate the mono-flops 2117, 2118, i.e., to calibrate the duration of the above mono-flop time constants of 2τ and 4τ, e.g., by use of a respective calibration circuit/time constant setting circuit 2122.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating an electronic system including sending a signal, comprising:
    changing a parameter of the signal after a first time duration if a first information is to be transmitted, and changing the parameter of the signal after a second time duration if a second information is to be transmitted, wherein the length of the first or second time duration is determined in a training phase.

2. The method of claim 1, comprising:
    changing the parameter of the signal after a third time duration if a third information is to be transmitted.

3. The method of claim 2, comprising:
    changing the parameter of the signal after a fourth time duration if a fourth information is to be transmitted.

4. The method of claim 3, comprising wherein the fourth information is a control information.

5. The method of claim 2, wherein the third information is a control information.

6. The method of claim 5, comprising wherein the control information is an information to stop a process.

7. The method of claim 5, comprising wherein the control information is an information to begin a process.

8. The method of claim 1, comprising wherein the first time duration is longer than the second time duration.

9. The method of claim 1, comprising wherein the first information is a logic zero, and the second information is a logic one.

10. The method of claim 1, comprising wherein the first information is a logic one, and the second information is a logic zero.

11. The method of claim 1, comprising wherein the parameter of the signal is defined from a group consisting of an amplitude of the signal, a frequency of the signal, and a phase of the signal.

12. A method of operating an electronic system including receiving a signal, comprising:
    detecting that a first information was transmitted if it is detected that a parameter of the signal changes after a first time duration; and
    detecting that a second information was transmitted if it is detected that the parameter of the signal changes after a second time duration,
    wherein the length of the first or second time duration is determined in a training phase.

13. The method of claim 12, comprising:
    detecting that a third information was transmitted if it is detected that the parameter of the signal changes after a third time duration.

14. A data transmission method, comprising:
    changing a parameter of a signal from a first value to a second value after a first time duration if a logic zero is to be transmitted; and
    changing the amplitude of the signal from the first value to the second value after a second time duration if a logic one is to be transmitted,
    wherein the length of the first or second time duration is determined in a training phase.

15. The method of claim 14, comprising:
    changing the parameter of the signal back from the second value to the first value after the first time duration if a logic zero is to be transmitted; and
    changing the amplitude of the signal back from the second value to the first value after the second time duration if a logic one is to be transmitted.

16. The method of claim 14, comprising:
    wherein the parameter is amplitude.

17. The method of claim 14, comprising:
    wherein the parameter is frequency.

18. An electronic system including an interface comprising:
    a transmitter configured to change a parameter of a signal after a first time duration if a first information is to be transmitted, and change the parameter of the signal after a second time duration if a second information is to be transmitted, wherein the length of the first or second time duration is determined in a training phase.

19. The electronic system of claim 18, comprising:
    an integrated circuit.

20. The system of claim 19, comprising:
    wherein the integrated circuit includes the interface.

21. An electronic system including an interface comprising:
    a receiver configured to detect that a first information was transmitted in response to detecting that a parameter of a signal changes after a first time duration, and configured to detect that a second information was transmitted in response to detecting that the parameter of the signal changes after a second time duration, wherein the length of the first or second time duration is determined in a training phase.

22. The system of claim 21, comprising:
    an integrated circuit.

23. The system of claim 22, comprising:
    where the integrated circuit includes the interface.

24. A method of operating an electronic system including sending a signal, comprising:
    if as a first information a logic one is to be transmitted, changing an amplitude of the signal from a first value to a second value after a first time duration, and
    if as the first information a logic zero is to be transmitted, changing the amplitude of the signal from the first value to the second value after a second time duration; and
    if after the first information as a second information a logic one is to be transmitted, changing the amplitude of the signal back from the second value to the first value immediately after the first time duration, and
    if after the first information as the second information a logic zero is to be transmitted, changing the amplitude of the signal back from the second value to the first value immediately after the second time duration.

* * * * *